Feb. 2, 1965 R. G. BROOKINS ET AL 3,168,209
DUST COVER
Filed Nov. 29, 1962
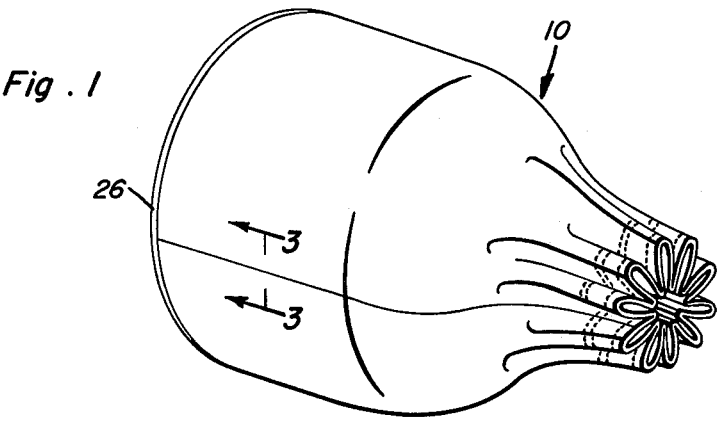
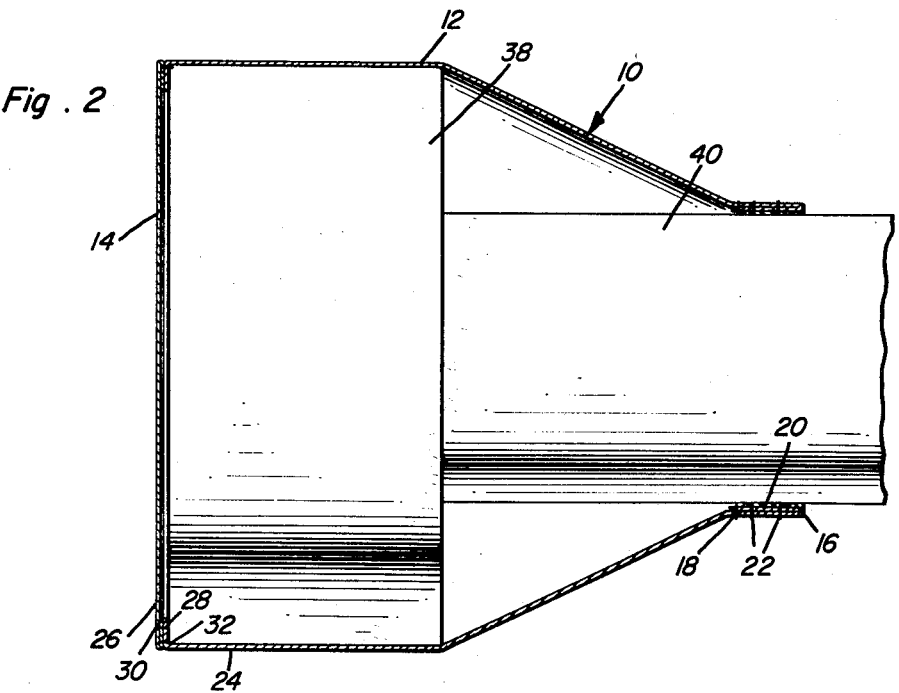
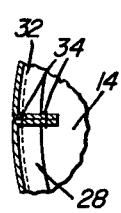
Roy Glen Brookins
Royce E. Hiler
INVENTORS
BY *[signatures]*
Attorneys

3,168,209
DUST COVER
Roy Glen Brookins, 1620 Spruce St., and Royce E. Hiler, 1339 S. Seneca St., both of Denver Colo.
Filed Nov. 29, 1962, Ser. No. 240,823
2 Claims. (Cl. 220—24)

This invention relates to a novel and useful cryogenic dust cover and more specifically to a dust cover for enclosing and sealing exposed ends of interconnecting conduit members which are utilized to convey cryogenic materials such as highly oxidized rocket fuels and the like.

The main object of this invention is to provide a reusable self-enclosing universal protective covering which will ensure the exclusion of undesirable foreign particles of either organic or inorganic nature full of energy and electrical particles of the high energy level from the inner or interconnecting surfaces of the interconnecting conduit during the time these conduit members are not actually being utilized for their intended function.

Another object of this invention is to provide a self-closing universal protective cover which shall respond and retain its self-closing and sealing characteristics when either the object being enclosed or the cover or both are subjected to extreme changes in temperature and atmosphere conditions either above or below normal conditions and still continue to function properly then and thereafter.

Still another object of this invention is to provide a versatile self-closing universal cover which may be quickly and easily slipped over the object to be protected regardless of the size, shape or type of material that the conduit is constructed of and regardless of atmospheric temperature and pressure conditions.

Yet another object of this invention is to provide a self-closing universal protective cover and impermeable membrane which may be constructed of various materials or a combination of materials and which also may be constructed of a combination of more than one thickness of membrane or utilized in pairs or more of covers in order that a single or variety of temperature and/or pressure conditions may be coped with while still enabling the cover or covers to exclude either one or a variety of contaminance.

A final object of this invention is to provide a cover in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the dust cover of the instant invention;

FIGURE 2 is a longitudinal vertical sectional view on somewhat of an enlarged scale taken substantially upon a plane passing through the longitudinal center line of the cover and shown with the cover mounted on the end of a conduit including a diametrically enlarged terminal end portion; and FIGURE 3 is a fragmentary sectional view showing the manner in which the opposite ends of the panel comprising the cylindrical body are secured together and with the conduit removed from within the cover.

Referring now more specifically to the drawings, the numeral 10 generally designates the cryogenic dust cover of the instant invention. From FIGURE 2 of the drawings, it may be seen that the dust cover includes a generally cylindrical body member 12 and a generally circular end wall 14. The cylindrical body member and end wall 14 are each constructed of flexible material such as canvas although it is to be noted that a variety of different types of materials may be utilized in the construction of the dust cover to meet certain predetermined requirements.

The open end of the cylindrical body member includes an annular inturned portion folded back upon and stitched to the unfolded portion of that end. The annular inturned portion 16 is stitched to the remainder of the cylindrical body member 12 by means of a row of stitching 18.

It may also be seen from FIGURE 2 of the drawings that an annular elastomeric member 20 is secured about the inside of the back inturned annular portion 16. The elastomeric member 20 is secured to the hem formed by the inturned portion 16 by means of a double row of stitching 22.

From FIGURE 2 of the drawings, it may further be seen that the cylindrical body member 12 includes an outer surface 24 and that the end wall 14 includes an outer surface 26. The closed end of the body member 12 includes an inturned annular terminal edge portion 28 and the end wall includes an outer annular portion 30 which is turned inwardly. The outer annular portion 30 and the inturned annular terminal edge portion 28 are disposed with their outer surfaces in surface to surface contacting relation and secured together by means of a single row of stitching 32.

With attention now directed to FIGURE 3 of the drawings it may be seen that the body member 12 comprises an elongated panel whose opposite ends are sewn together by means of a double row of stitching 34.

The dust cover 10 is illustrated and described as being constructed of canvas material and as previously set forth it is to be noted that other materials may be utilized. In the event plastic materials or the like are utilized in the construction of the cover 10, the various seams and hems may be formed by thermal welding processes. Additionally, depending upon the type of material used in the construction of the dust cover 10, numerous types of means may be provided for forming the various hems of the cover 10.

It is further to be noted that the elastomeric member 20 is secured to the hem formed by the annular inturned portion 16 when the open end of the cover 10 is fully opened and while the elastomeric member 20 is in a stretched condition. In this manner, the normal resiliency of the elastomeric member 20 will draw the opened end of the cover closed as viewed in FIGURE 1 of the drawings.

In order to apply the dust cover 10 to the diametrically enlarged terminal end portion 38 of the conduit 40, the opened end of the dust cover 10 is first opened to its fullest extent and then slipped over the diametrically enlarged end portion 38. Thereafter, when the opened end of the dust cover 10 is released, the elastomeric member 20 will draw the opened end of the cylindrical member 12 tightly about the conduit 40.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A cryogenic dust cover for enclosing and sealing exposed ends of interconnecting conduit members, said dust cover including a generally cylindrical body member constructed of flexible material, a generally circular end wall secured to and closing one end of said cylindrical body member, means operatively connected to the other end of said body member for drawing portions of the marginal edge portions of said other end radially inwardly toward the longitudinal center axis of said body member and causing said portions of said marginal edge portions to closely embrace a conduit member having one end disposed within said other end of said body member, said other end of said body member including an annular inturned portion folded back upon and stitched to said one end, said means comprising a cylindrical elastomeric member disposed inside and stitched to the inner surface of said annular inturned portion.

2. The combination of claim 1 wherein said end wall is also constructed of flexible material and said end wall is stitched to said body member, said body member and said end wall each including inner and outer surfaces, said one end of said body member including an inturned annular terminal edge portion, and said end wall including an outer annular portion turned inwardly over the inner surface of said end wall, the outer surfaces of said end wall and body member annular portions being disposed in surface to surface abutting relation and stitched together remote from their free edge portions.

References Cited by the Examiner

UNITED STATES PATENTS

| | | | |
|---|---|---|---|
| 2,064,411 | 12/36 | Brandstein. | |
| 2,467,503 | 4/49 | Scriven | 150—3 |
| 2,715,928 | 8/55 | Coy et al. | 150—3 |

THERON E. CONDON, *Primary Examiner.*

EARLE J. DRUMMOND, *Examiner.*